United States Patent
Elias

(10) Patent No.: US 7,660,312 B2
(45) Date of Patent: Feb. 9, 2010

(54) METHOD AND APPARATUS FOR RESHAPING CELL-BASED TRAFFIC

(75) Inventor: Mark A. Elias, Eastpointe, MI (US)

(73) Assignee: AT&T Intellectual Property, I, L.P., Reno, NV (US)

( * ) Notice: Subject to any disclaimer, the term of this patent is extended or adjusted under 35 U.S.C. 154(b) by 623 days.

(21) Appl. No.: 11/156,813

(22) Filed: Jun. 20, 2005

(65) Prior Publication Data
US 2007/0002896 A1 Jan. 4, 2007

(51) Int. Cl.
*H04L 12/56* (2006.01)
(52) U.S. Cl. .................... 370/395.52; 370/230
(58) Field of Classification Search .......... 370/230, 370/230.1, 395.1, 395.6, 395.21, 229, 236, 370/395.52, 466, 503, 535; 709/218
See application file for complete search history.

(56) References Cited

U.S. PATENT DOCUMENTS

| | | | | |
|---|---|---|---|---|
| 5,323,399 A * | 6/1994 | Kurano | | 370/398 |
| 5,633,589 A * | 5/1997 | Mercer | | 324/326 |
| 5,640,389 A * | 6/1997 | Masaki et al. | | 370/418 |
| 5,696,764 A * | 12/1997 | Soumiya et al. | | 370/395.41 |
| 5,872,789 A * | 2/1999 | Orleth et al. | | 370/517 |
| 6,016,311 A | 1/2000 | Gilbert et al. | | |
| 6,480,888 B1 * | 11/2002 | Pedersen | | 709/218 |
| 6,658,010 B1 | 12/2003 | Enns et al. | | |
| 6,920,109 B2 * | 7/2005 | Yazaki et al. | | 370/230.1 |
| 6,958,975 B1 * | 10/2005 | Kawataka | | 370/236 |
| 7,586,923 B2 * | 9/2009 | Zhao et al. | | 370/395.52 |
| 2003/0137936 A1 * | 7/2003 | Cornet et al. | | 370/230 |
| 2005/0018697 A1 | 1/2005 | Enns et al. | | |
| 2005/0036520 A1 * | 2/2005 | Zeng et al. | | 370/503 |

FOREIGN PATENT DOCUMENTS

| WO | WO9950997 | * 10/1999 |
|---|---|---|
| WO | WO 2004 047374 | 6/2004 |

* cited by examiner

*Primary Examiner*—Kwang B Yao
*Assistant Examiner*—Andrew Lai
(74) *Attorney, Agent, or Firm*—Ed Gunlin; Andrew C. Gust; Akerman Senterfitt

(57) ABSTRACT

A communication network (100) has a plurality of cell-based routers (104), a plurality of frame-based routers (108), and a bidirectional cell and frame based switch (110) coupled to the cell-based routers, and frame-based routers. Each of the cell-based routers is programmed to reshape (204) traffic bandwidth to avoid packet losses at the frame-based routers, and route (206) cell-based traffic to the bidirectional cell and frame based switch according to the updated bandwidth.

15 Claims, 3 Drawing Sheets

100

200

| Scenario #1 | Frame Rate | ATM Rate | Sessions | Frame Relay | Asymmetry Factor | ATM |
|---|---|---|---|---|---|---|
| Frame Relay -> ATM | | | | 1,536,000 | 113% | 1,735,680 |
| G.711 Codec / 20 ms Interval | 83,200 | 106,000 | 18 | 1,497,600 | | 1,908,000 |
| 1500 Bytes FTP | 12,384 | 13,992 | 124 | 1,535,616 | | 1,735,008 |
| ATM -> Frame Relay | | | | | | |
| G.711 Codec / 20 ms Interval | 83,200 | 106,000 | 16 | 1,331,200 | | 1,696,000 |
| 1500 Bytes FTP | 12,384 | 13,992 | 124 | 1,535,616 | | 1,735,008 |
| Scenario #2 | | | | | | |
| Frame Relay -> ATM | | | | 1,536,000 | 120% | 1,843,200 |
| G.711 Codec / 20 ms Interval | 83,200 | 106,000 | 18 | 1,497,600 | | 1,908,000 |
| 1500 Bytes FTP | 12,384 | 13,992 | 124 | 1,535,616 | | 1,735,008 |
| ATM -> Frame Relay | | | | | | |
| G.711 Codec / 20 ms Interval | 83,200 | 106,000 | 17 | 1,414,400 | | 1,802,000 |
| 1500 Bytes FTP | 12,384 | 13,992 | 131 | 1,622,304 | | 1,832,952 |
| Scenario #3 | | | | | | |
| Frame Relay -> ATM | | | | 1,536,000 | 150% | 2,304,000 |
| G.711 Codec / 20 ms Interval | 83,200 | 106,000 | 18 | 1,497,600 | | 1,908,000 |
| 1500 Bytes FTP | 12,384 | 13,992 | 124 | 1,535,616 | | 1,735,008 |
| ATM -> Frame Relay | | | | | | |
| G.711 Codec / 20 ms Interval | 83,200 | 106,000 | 21 | 1,747,200 | | 2,226,000 |
| 1500 Bytes FTP | 12,384 | 13,992 | 164 | 2,030,976 | | 2,294,688 |
| Scenario #4 | | | | | | |
| Frame Relay -> ATM | | | | 1,536,000 | 150% | 2,304,000 |
| G.711 Codec / 20 ms Interval | 83,200 | 106,000 | 18 | 1,497,600 | | 1,908,000 |
| 1500 Bytes FTP | 12,384 | 13,992 | 124 | 1,535,616 | | 1,735,008 |
| ATM -> Frame Relay | | | | | | |
| *Frame Aware ATM Shaping Implemented* | | | | | | |
| G.711 Codec / 20 ms Interval | 83,200 | 106,000 | | 1,497,600 | | 1,908,000 |
| 1500 Bytes FTP | 12,384 | 13,992 | | 1,535,616 | | 1,735,008 |

FIG. 3

METHOD AND APPARATUS FOR RESHAPING CELL-BASED TRAFFIC

FIELD OF THE INVENTION

This invention relates generally to content services, and more particularly to a method and apparatus for reshaping cell-based traffic.

BACKGROUND OF THE INVENTION

Historically, ATM (Asynchronous Transfer Mode) has been a cell-based transport protocol, without any significant knowledge or understanding of the underlying frame (also referred to as packet) structure that is being transmitted. Technology advances have taken a path whereby more and more functions are being moved to frame-based services. The fixed length cells that have made ATM such a deterministic transport are now becoming a liability with frame-based services and transports.

ATM has always had more overhead than most other protocols. Although the ATM cell header is only 5 bytes, this overhead is imposed on each cell. Given that cells are only 53 bytes long, this amounts to almost 10% overhead. This fixed overhead is often referred to as a "cell tax". For large frames, 1000 bytes and more, this can amount to over a hundred bytes of cell headers. In addition, cells must be padded out to a total of 48 payload bytes. While the overhead for large frames can be about 10%, the real problems happen with small frames. Aside from the cell tax, for small frames the required cell padding can account for as much as 40% additional overhead. A 60 byte frame therefore requires 2 cells worth of payload, with the second cell including 12 bytes of real data and 36 bytes of padding.

Up until recently, normal traffic mixes would only generate a small percentage of these tiny data frames. However, the advent of Voice over IP (VoIP) is creating a substantial increase in packetized voice traffic and its resultant small frames. This becomes a problem when a cell-based transport is combined with a frame-based transport.

FR (Frame Relay) to ATM (FR/ATM) intercommunications is accomplished by linking the virtual connections of a frame relay interface with that of an ATM interface. Frame relay is a frame-based transport. Part of the function performed by the FR and ATM switches is the conversion of ATM cells to frames and frames to ATM cells. This function is dependent on the definition of the virtual connection. Because ATM transport has more overhead than frame relay, the typical guidelines for creating an FR/ATM connection is to provide more bandwidth on the ATM side of the connection to account for this added overhead.

Historically, this asymmetry in FR/ATM provisioning has been based on the generally acceptable mixtures of small, medium, and large data frames as found on the Internet. Known as the IMIX (Internet MIXture); the resultant provisioning guidelines typically call for 12 to 18% extra bandwidth on the ATM side of the interface. These guidelines, while appropriate for IMIX traffic, does not work well for traffic flows that are mixed voice and data, or predominantly VoIP. VoIP traffic can require anywhere from 15 to 110% extra bandwidth on the ATM side of a FR/ATM connection. Although this can be a well defined quantity, depending upon the VoIP CODEC (Coder/Decoder) and sampling interval, any change in these parameters can greatly impact the asymmetry percentage. Mixed voice and data traffic presents other problems that are also found with varying CODECs and sampling intervals.

The problem with mixed voice and data traffic is that on the frame relay side of the connection if there is insufficient ATM bandwidth it will not be possible for the ATM network to generate the necessary number of cells to carry the frames supplied by the frame relay network. This is especially true for small frames that will generate a proportionally larger number of cells greater than the ATM network can support. The converse is also true of large frames that are presented to the ATM network. If the asymmetry percentage is too high and the ATM bandwidth is much larger than the frame relay bandwidth, large frames will be packaged in cells with little overhead or padding. As these cells are converted back to frames, there will be more frames generated than can be handled by the frame relay network. Either of these scenarios can result in data losses that can impact customer services. While it is possible to optimize the FR/ATM interface for either large or small frames, it is currently not possible to do both at the same time.

SUMMARY OF THE INVENTION

Embodiments in accordance with the invention provide a method and apparatus for reshaping cell-based traffic.

In a first embodiment of the present invention, a communication network has a plurality of cell-based routers, a plurality of frame-based routers, and a bidirectional cell and frame based switch coupled to the cell-based routers, and frame-based routers. Each of the cell-based routers is programmed to reshape traffic bandwidth to avoid packet losses at the frame-based routers, and route cell-based traffic to the bidirectional cell and frame based switch according to the updated bandwidth.

In a second embodiment of the present invention, a plurality of cell-based routers coupled to a bidirectional cell and frame based switch has a computer storage medium having computer instructions for reshaping cell-based traffic bandwidth to avoid packet losses at frame-based routers coupled bidirectional cell and frame based switch, and routing cell-based traffic to the bidirectional cell and frame based switch according to the updated bandwidth.

In a third embodiment of the present invention, a plurality of cell-based routers coupled to a bidirectional cell and frame based switch operates according to a method having the steps of reshaping cell-based traffic bandwidth to avoid packet losses at the frame-based routers coupled to the bidirectional cell and frame based switch, and routing cell-based traffic to the bidirectional cell and frame based switch according to the updated bandwidth.

BRIEF DESCRIPTION OF THE DRAWINGS

FIG. 3 depicts a table illustrating the operation of the frame-based and cell-based routers according to an embodiment of the present invention.

DETAILED DESCRIPTION OF THE DRAWINGS

Figure 1:
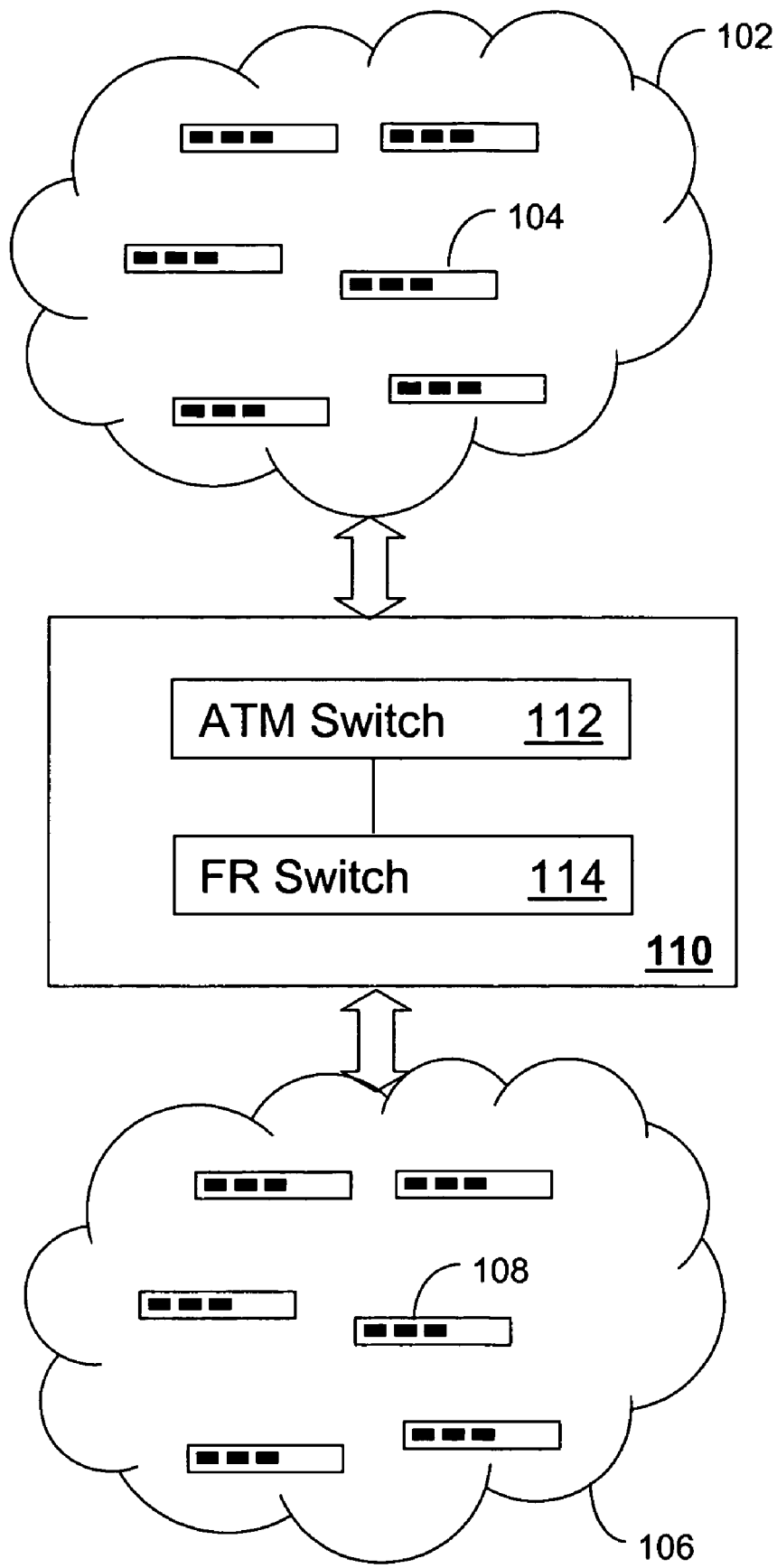
FIG. 1 is block diagram of a hybrid cell and frame based communication network according to an embodiment of the present invention.

While the specification concludes with claims defining the features of embodiments of the invention that are regarded as novel, it is believed that the embodiments of the invention will be better understood from a consideration of the following description in conjunction with the figures, in which like reference numerals are carried forward.

FIG. 1 is block diagram of a hybrid cell and frame based communication network 100 according to an embodiment of the present invention. As depicted in FIG. 1, the communication network 100 comprises a cluster 102 of cell-based routers 104 coupled to a bidirectional cell and frame based switch 110. The switch 110 is also coupled to a cluster 106 of frame-based routers 108. Cell-based routers 104 utilizes conventional technology for routing, for example, ATM (Asynchronous Transfer Mode) traffic. A frame-base routers 108, on the other hand, utilize conventional technology for routing frame (packet) traffic.

A conventional frame relay (FR) switch 114 is used for directing frame traffic to an ATM switch 112 which converts the frame-based traffic to cell-based traffic. The cell-based traffic is then supplied to the cell-based routers 104. In the reverse direction, the ATM switch 112 accepts ATM traffic from the cell-based cluster 102 and directs the traffic to the FR switch 114 for translation of cell-based traffic to frame-based traffic. Cell-based traffic operates according to fixed-sized frames, while frame-based traffic utilizes variable-sized frames.

FIG. 3 depicts a table illustrating the operation of the frame-based and cell-based routers 104 and 108 according to an embodiment of the present invention. Scenarios 1 through 3 depict the issues with prior art systems, while Scenario 4 illustrates a solution to said deficiencies in accordance with the present invention.

Scenario 1 shows a case where the bandwidth of the ATM cluster 102 is increased 13% above the data rate of a frame relay cluster 106. That is, at a frame relay rate of 1,536,000 bps (bits per second), there is a 113% asymmetry between the FR and cell-based clusters 106 and 102, respectively, so as to produce an ATM data rate of 1,736,680 bps. In networks where VoIP is not prevalent, such an asymmetry may be sufficient to support mostly data traffic. However, as VoIP traffic increases, thereby generating a high volume of small frames, the asymmetry may not be sufficient.

In the present illustration, for example, VoIP traffic sourced by a conventional codec such as G.711 requires a data rate of 83,200 bps. To support this rate, an ATM rate of 106,000 bps is needed. With 18 simultaneous sessions (i.e., 18 simultaneous VoIP calls), the frame relay rate needs to be 1,497,600 bps (83,200*18), while the ATM rate required is 1,908,000 bps (106,000*18). The FR rate is within the bounds of its operating bandwidth (1,536,000 bps). The same cannot be said of the ATM cluster 102. Thus, when VoIP traffic is high (such as in this example) the ATM cluster 102 cannot support the large number of small frames sourced by the FR cluster 106 without data losses.

In the opposite direction (i.e., ATM to FR transition), 16 simultaneous sessions are supported on the ATM cluster 102. This translates to an ATM rate of 1,735,008 bps, and an FR rate of 1,331,200 bps, both of which are within their operating capability. In the case of data transfers using FTP (File Transfer Protocol) the ATM cluster 102 and FR cluster 106 have no problem supporting bidirectional transfers.

Scenarios 2 and 3 illustrate what can happen when the asymmetry in bandwidth between the ATM cluster 102 and FR cluster 106 is increased to overcome the issues highlighted in scenario 1. At an asymmetry of 120%, the ATM cluster 102 can now process 18 simultaneous sessions of VoIP traffic from the FR cluster 106. However, downstream FTP traffic becomes a problem for the FR cluster 106 for 131 simultaneous data sessions. Upon increasing the asymmetry to 150%, the ATM cluster 102 can continue to process 18 simultaneous sessions of VoIP traffic from the FR cluster 106. However, downstream VoIP traffic and FTP traffic become a problem for the FR cluster 106 at 17 and 131 simultaneous VoIP and data sessions, respectively.

Figure 2:
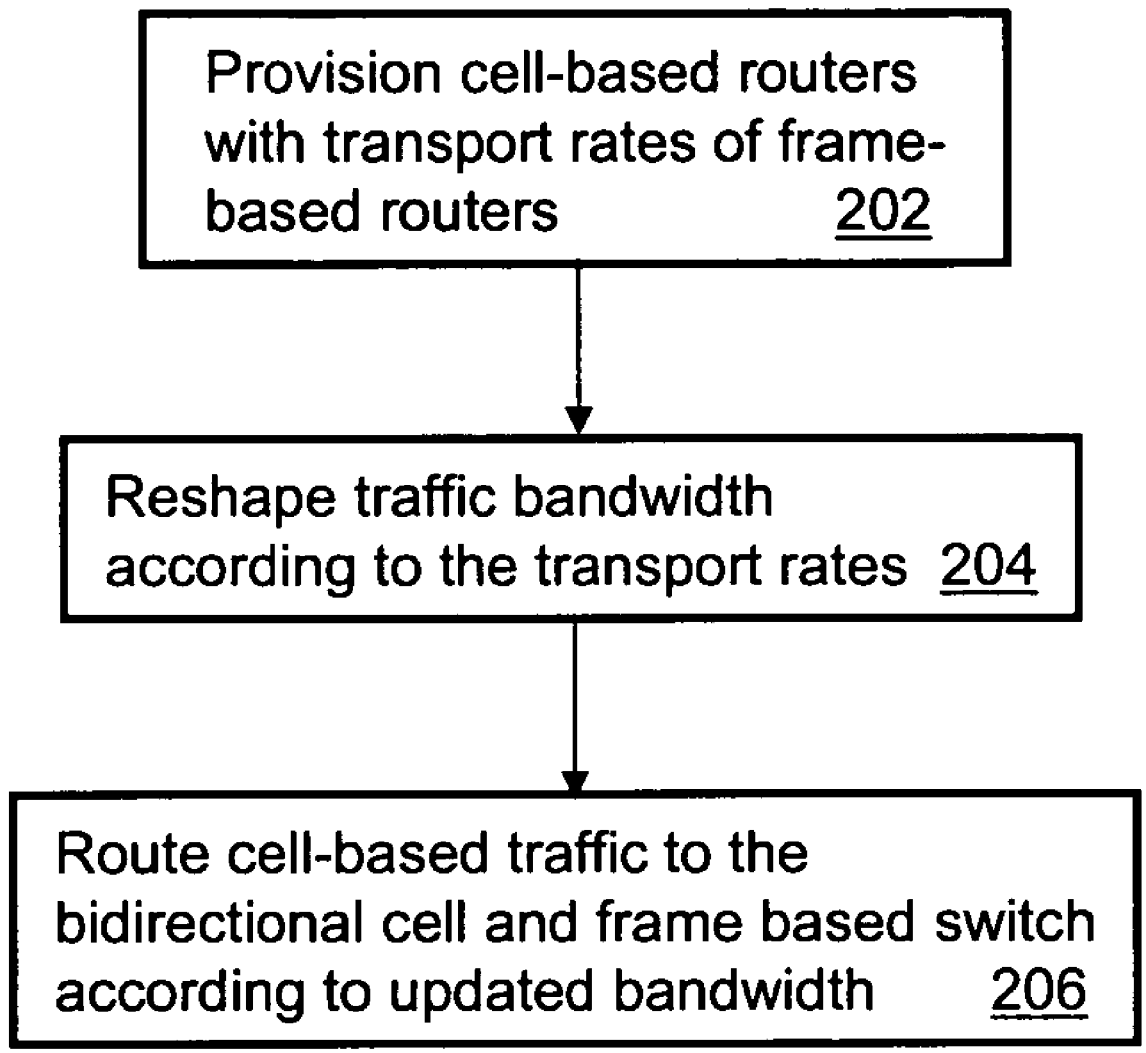
FIG. 2 depicts a flowchart of a method operating in the cell-based routers according to an embodiment of the present invention.

To overcome these deficiencies in the art, each of the cell-based routers 104 are programmed according to a method 200 as depicted in FIG. 2 in accordance with the present invention. Method 200 begins with step 202, whereby each cell-based router 104 is provisioned with the transport rates of at least one of the frame-based routers 108 of the FR cluster 106. The step of provisioning the cell-based routers 104 can be static or dynamic. That is, the cell-based routers 104 can be provisioned once in a network 100 under an assumption that the FR to ATM asymmetries remain constant. Alternatively, where asymmetries can be varied, the cell-based routers 104 can be provisioned periodically as network adjustments take place.

Once provisioned, the cell-based router 104 proceeds to step 204 where it reshapes traffic bandwidth according to the transport rates of the frame-based routers 108. Referring back to FIG. 3, the reader will recall that in scenario 3, the downstream traffic from the ATM cluster 102 to the FR cluster 106 was problematic. That is, the FR cluster 106 was unable to process the ATM traffic for VoIP or FTP at an asymmetry of 150%. With the present invention in accordance with step 204, the cell-based routers 104 are programmed to reshape their output bandwidth according to the traffic rate supported by the frame-based routers 108. Accordingly, a cell-based router will buffer data cells so as to adjust the cell transmission rate in step 206 so that a frame relay rate sourced by the switch 110 is within the operating constraints of the frame-based routers 108. This is reflected in scenario 4 of FIG. 3, wherein the upstream and downstream FR rates are forced by the cell-based routers 104 to be identical and therein within the operating range of the FR cluster 106.

It should be evident by now that the present invention can be realized in hardware, software, or a combination of hardware and software. Moreover, the present invention can be realized in a centralized fashion, or in a distributed fashion where different elements are spread across several interconnected processors. Any kind of computer device or other apparatus adapted for carrying out method 200 described above is suitable for the present invention.

Additionally, the present invention can be embedded in a computer program product, which comprises all the features enabling the implementation of method 200, and which when loaded in a computer system is able to carry out these methods as computer instructions. A computer program in the present context means any expression, in any language, code or notation, of a set of instructions intended to cause a system having an information processing capability to perform a particular function either directly or after either or both of the following: a) conversion to another language, code or notation; b) reproduction in a different material form.

It should be also evident from the embodiments that the present invention may be used for many applications. Thus, although the description is made for particular arrangements and methods, the intent and concept of the invention is suitable and applicable to other arrangements and applications not described herein. It would be clear therefore to those skilled in the art that modifications to the disclosed embodiments described herein could be effected without departing from the spirit and scope of the invention.

In accordance with various embodiments of the present invention, the methods described herein are intended for operation as software programs running on a computer processor. Dedicated hardware implementations including, but not limited to, application specific integrated circuits, programmable logic arrays and other hardware devices can likewise be constructed to implement the methods described herein. Furthermore, alternative software implementations including, but not limited to, distributed processing or component/object distributed processing, parallel processing, or virtual machine processing can also be constructed to implement the methods described herein.

It should also be noted that the software implementations of the present invention as described herein are optionally stored on a tangible storage medium, such as: a magnetic medium such as a disk or tape; a magneto-optical or optical medium such as a disk; or a solid state medium such as a memory card or other package that houses one or more readonly (non-volatile) memories, random access memories, other re-writable (volatile) memories or Signals containing instructions. A digital file attachment to e-mail or other self-contained information archive or set of archives sent through signals is considered a distribution medium equivalent to a tangible storage medium. Accordingly, the invention is considered to include a tangible storage medium or distribution medium, as listed herein and including art-recognized equivalents and successor media, in which the software implementations herein are stored.

Although the present specification describes components and functions implemented in the embodiments with reference to particular standards and protocols, the invention is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

Accordingly, the described embodiments ought to be construed to be merely illustrative of some of the more prominent features and applications of the invention. It should also be understood that the claims are intended to cover the structures described herein as performing the recited function and not only structural equivalents. Therefore, equivalent structures that read on the description should also be construed to be inclusive of the scope of the invention as defined in the following claims. Thus, reference should be made to the following claims, rather than to the foregoing specification, as indicating the scope of the invention.

What is claimed is:

1. A communication network, comprising
a plurality of cell-based routers;
a plurality of frame-based routers; and
a bidirectional cell and frame based switch coupled to the cell-based routers and frame-based routers for transmitting VoIP traffic in a bi-directional manner among the cell-based and frame-based routers, wherein each of the cell-based routers is provisioned with a transport rate of at least one of the frame-based routers, and wherein each of the cell-based routers is programmed to:
reshape traffic bandwidth by adjusting cell transmission rate to avoid packet losses at the frame-based routers, wherein the cell transmission rates for each of the cell-based routers is adjusted based on the provisioned transport rate of the frame-based router, wherein each of the cell-based routers adjusts the cell transmission rate by buffering data cells; and
route cell-based traffic to the bidirectional cell and frame based switch according to the updated bandwidth.

2. The communication network of claim 1, wherein the cell transmission rate adjustment results in upstream and downstream frame relay rates being equal.

3. The communication network of claim 2, wherein the cell transmission rate is adjusted so that a frame relay rate sourced by the switch remains within operating parameters associated with the at least one of the frame-based routers.

4. The communication network of claim 1, wherein the bidirectional cell and frame based switch comprises:
an ATM (Asynchronous Transfer Mode) switch; and
an FR (Frame Relay) switch, wherein the ATM and FR switches are coupled, and wherein said switches exchange cell-based and frame-based traffic.

5. The communication network of claim 1, wherein the cell-based traffic comprises fixed-sized frames, and wherein the frame-based traffic comprises variable-sized frames.

6. In a plurality of cell-based routers coupled to a bidirectional cell and frame based switch, a computer readable non-transitory storage medium: encoded with computer executable instructions for:
storing at each of the cell-based routers a transport rate of at least one frame-based router;
reshaping cell-based traffic bandwidth by buffering data cells at each of the cell-based routers to avoid packet losses at the frame-based router coupled to the bidirectional cell and frame based switch, wherein cell transmission rates for each of the cell-based routers is adjusted based on the stored transport rate of the frame-based router and
routing cell-based traffic to the bidirectional cell and frame based switch according to the updated bandwidth.

7. The storage medium of claim 6, wherein the cell transmission rate adjustment results in upstream and downstream frame relay rates being equal.

8. The storage medium of claim 6, wherein the cell-based traffic comprises fixed-sized frames, and wherein the frame-based traffic comprises variable-sized frames.

9. In a plurality of cell-based routers coupled to a bidirectional cell and frame based switch, a method comprising the steps of:
buffering data cells at the cell-based routers wherein the buffering adjusts a cell transmission rate associated with each of the cell-based routers and wherein the adjustment is based on transport rates of at least one frame-based router to avoid packet losses at the frame-based routers coupled to the bidirectional cell and frame based switch, wherein at least one of the cell-based routers is provisioned with the transport rate of at least one of the frame-based routers; and
routing cell-based traffic to the bidirectional cell and frame based switch.

10. The method of claim 9, wherein each of the cell-based routers is provisioned with the transport rate of at least one of the frame-based routers.

11. The method of claim 10, wherein provisioning is statically determined.

12. The method of claim 10, wherein provisioning is dynamically determined according to adjustments made to the transport rate of the at least one frame-based router.

13. The method of claim 10, comprising adjusting a cell transmission rate by the buffering of the data cells so that a frame relay rate sourced by the switch remains within operating parameters associated with the at least one of the frame-based routers.

14. The method of claim 12, comprising adjusting a cell transmission rate by the buffering of the data cells so that a frame relay rate sourced by the switch remains within operating parameters associated with the at least one of the frame-based routers.

15. The method of claim 9, wherein the cell-based traffic comprises fixed-sized frames, and wherein the frame-based traffic comprises variable-sized frames.

* * * * *